United States Patent [19]

Austin

[11] 4,062,921
[45] Dec. 13, 1977

[54] SOLVENTS FOR AND PURIFICATION OF CHITIN

[75] Inventor: Paul R. Austin, Wilmington, Del.

[73] Assignee: University of Delaware, Newark, Del.

[21] Appl. No.: 659,280

[22] Filed: Feb. 19, 1976

[51] Int. Cl.$^2$ .............................................. C07H 5/06
[52] U.S. Cl. .................................... 264/233; 106/203; 260/32.8 N; 264/186; 264/207; 264/217; 264/299
[58] Field of Search ............... 264/186, 194, 207, 217, 264/218, 233, 299; 260/32.8 N; 106/203

[56] References Cited

U.S. PATENT DOCUMENTS

| | | | |
|---|---|---|---|
| 2,040,880 | 5/1936 | Rigby | 536/20 |
| 2,689,244 | 9/1954 | Jones | 536/20 |
| 3,068,188 | 12/1962 | Beste et al. | 260/30.2 |
| 3,703,570 | 11/1972 | Busch et al. | 264/41 |
| 3,879,377 | 4/1975 | Austin | 536/20 |
| 3,892,731 | 7/1975 | Austin | 536/20 |
| 3,989,535 | 11/1976 | Capozza | 106/203 |

OTHER PUBLICATIONS

Solubility & Reactivity of Marine Polymers in Dimethylformamide–$N_2O_4$, Allan et al., 1/1971, Chemistry and Industry, p. 127.

Polyamides–Solubility–Kirk–Othmer, Encyclopedia of Chemical Technology, vol. 16, pp. 6, 7.

*Primary Examiner*—Jeffery R. Thurlow
*Attorney, Agent or Firm*—John J. McDonnell

[57] ABSTRACT

New solvents for chitin comprising dimethylacetamide, N-methylpyrrolidone or mixtures of these in combination with a minor proportion of lithium chloride, and their use in the purification of chitin for regeneration in the form of films and fibers are described.

2 Claims, No Drawings

SOLVENTS FOR AND PURIFICATION OF CHITIN

The Government of the United States has rights in this invention pursuant to Grant No. 04-3-158-30 with the Department of Commerce.

BACKGROUND OF THE INVENTION

This invention relates to new solvents for chitin and their use in the purification of chitin.

Chitin is an aminocellulose derivative that occurs widely in nature, for example, in the cell walls of fungi, bovine cartilage, cuttlefish bone and the hard shell of insects and crustaceans. The waste from shrimp, lobster and crab seafood industries contains 10–15% chitin and is a potentially important source of chitin, although the isolation and purification of the chitin, associated therein with mineral components, protein and other ingredients, presents considerable difficulty.

The applications for chitin are not extensive, in part because it has been little investigated and in part because it is difficult to purify. The use of chitin for accelerating and promoting wound healing is described in U.S. Pat. No. 3,632,754, to L. L. Balassa, Jan. 4, 1972. In other literature, the difficulties of purification are mentioned frequently. Chitin is also employed in the manufacture of chitosan, a deacetylated chitin that is readily soluble in dilute acids and may find application in paper making and surface active agents, for example.

More specifically, chitin is a mucopolysaccharide, believed to be poly-N-acetyl-D-glucosamine, with an empirical formula of $(C_8H_{13}O_5N)_n$, in which n may be any number into the thousands range, but is commonly in the area of 100–10,000. Chitin is a generally intractable material, soluble only in strong mineral acids, lithium thiocyanate solutions, and other special concentrated salt solutions, most of which cause disintegration or rapid degradation with loss in molecular weight or hydrolysis of the acetyl groups or both.

More recently some new solvents for chitin are described by Paul R. Austin in U.S. Pat. No. 3,879,377, Apr. 22, 1975, and in U.S. Pat. No. 3,892,731, July 1, 1975. These solvents comprise a 1,2-chloroalcohol in admixture with an acidic solvent, e.g. sulfuric acid, and a chloracetic acid alone or in combination with other solvents, e.g. formic acid. These solvents provide useful means for purifying chitin and for regenerating the chitin in the form of films, fibers and the like. However these solutions of chitin are not as stable as desired for storage for considerable lengths of time.

In the isolation and utilization of chitin it is desirable to set specifications for the chitin material, for example, molecular weight, viscosity or optical activity. All of these properties require a stable non-degrading solvent for their determination; the solvents of the prior art give transient values that are difficult to duplicate because of continuing chitin degradation.

It is an object of this invention to provide a new class of solvents for chitin.

It is a further object to provide a method for preparing solutions of chitin that can be filtered, otherwise purified, processed, or their properties measured.

It is still another object to provide solutions of chitin from which the chitin can be regenerated in the form of films, fibers or other shaped objects.

It is a still further object to provide chitin solutions that are stable on storage for considerable periods of time.

SUMMARY OF THE INVENTION

It has now been found that chitin is dissolved by dimethylacetamide, N-methylpyrrolidone or mixtures of these amides in conjunction with a minor amount, e.g. 2% up to the saturation point, of lithium chloride, at room temperature or on moderate heating, e.g. at 50° C. Solutions containing up to 15% chitin are readily obtained, depending to some extent on the molecular weight of the chitin. Solvency is limited by viscosity of the solutions; the lower molecular weight chitins in general dissolve more readily and give lower viscosity systems. At higher concentrations of chitin, in the 10–15% range, an organisol system, plastic in character, is obtained. The chitin solutions can be purified by centrifuging, vacuum or pressure filtration, or other means as appropriate for the consistency of the solution and application involved.

For physical property determination and chitin characterization, dilute solutions of 1% or less of chitin are usually employed. For film and filament preparation by wet-casting and spinning technology, a solution 2–5% chitin is preferred and the shaped films or fibers are subsequently coagulated or renatured by treatment with excess acetone, for example, washed with water and dried at ambient or elevated temperature. The resulting films and fibers are pliable and strong and can be cold drawn to orient them and to improve their strength.

At higher concentrations of chitin, in the range of 5–15%, the solutions become very viscous, approaching a plastic consistency. They are handled best by heavy duty mixers, pressure filtration and other organisol techniques. Films may be prepared by calendering or doctoring onto a moving belt, followed by solvent evaporation, water extraction and drying. Filaments may be extruded and renatured either by dry spinning with solvent evaporation or by a non-solvent precipitation as customary in wet spinning. Processing is completed as previously described.

As indicated above the dimethylacetamide and N-methylpyrrolidone can be used alone or in mixtures of any proportions in combination with the lithium chloride. Proportions of lithium chloride ranging from 2–5% by weight of the tertiary amide solvent are preferred.

An important advantage of the chitin solutions of this invention is their improved stability on storage. They have a working life of at least one month at room temperature.

Chitin from various sources can be used with the solvents of this invention. Thus, chitin from red, blue, rock, king and Dungeness crabs, from lobsters, shrimp, and other crustaceans, and from the cell walls of fungi and the hard shells of insects are all operable.

The following examples illustrate in further detail the solvents of this invention and their use in the preparation of chitin films and fibers.

EXAMPLE 1

To a solution of one part of lithium chloride in 20 parts of dimethylacetamide is added 0.6 parts of chitin (red crab) and the mixture stirred at room temperature for one hour. Then 20 parts of N-methylpyrrolidone is added and the mixture stirred for 2 hours. The resulting solution is filtered through felt and the filtrate spread on a glass plate at a thickness of 1 mm. The wet film is dried for one hour in a current of air at room temperature, and then placed in excess acetone for 16 hours to extract solvent from the film. The film is extracted for another 24 hours with fresh acetone, and finally rinsed again with fresh acetone and dried in air at room temperature for 30 minutes. The film is cut into small strips and are cold drawn to produce a 66% increase in length. The drawn film is strong and pliable.

EXAMPLE 2

To a solution of 1 part of lithium chloride in 20 parts of dimethylacetamide is added 0.6 parts of chitin (blue crab) and the mixture stirred at room temperature for one hour; then 10 parts of dimethylacetamide is added and the mixture stirred for 2 hours. The resulting solution is filtered through felt and the filtrate spread on a glass plate at a thickness of 1 mm. The chitin is regenerated into a film as in Example 1. The film was cut in small strips (2 mm × 2.5 cm) and were cold drawn 83%. The tensile strength of the drawn film is 16.1 Kg/mm$^2$.

The chitin films cast from solution in dimethylacetamide and dimethylacetamide/N-methylpyrrolidone systems show syneresis, i.e. solvent exudes from the film as it stands for a short time, e.g. for an hour. This has the effect of concentrating the chitin in the resident film and facilitating its renaturing by immersion in acetone.

EXAMPLE 3

To a solution of 2.5 parts LiCl in 50 parts N-methyl-2-pyrrolidone is added 0.25 parts chitin (Dungeness crab) and the mixture is stirred at room temperature for 1.5 hours. The resulting solution is filtered through felt and the filtrate spread on a glass plate at a thickness of 1 mm. The chitin is regenerated into a film as in the previous examples. The film was cold drawable.

EXAMPLE 4

Five parts of finely divided chitin and 50 parts of dimethylacetamide containing 5% of lithium chloride is rapidly mixed at room temperature to thoroughly wet all of the chitin. At first the chitin appears to absorb the solvent to form discrete gel particles which upon standing and intermittent stirring convert to a very viscous mass. This mixture is worked periodically with a stirrer to promote gel particle attrition and develop a more coherent gelatinous system. After standing five days, the gelatinous material is doctored onto a platten and pressed to a coherent film. The solvent is removed by evaporation, followed by a water wash and drying. The resultant film is pliable and tough. The film can be cold drawn with typical necking down. Upon breaking at the extension limit, the fracture line shows fibrillation, as does polyethylene and other polymers capable of being cold drawn.

EXAMPLE 5

To 100 parts dimethylacetamide containing 5% lithium chloride 3.5 parts of chitin (red crab) was added and the mixture stirred for 18 hours. The resulting solution was filtered through felt and allowed to stand for 24 hours. Some of the solution was then spread on a glass plate to a thickness of 1 mm and regenerated as in example 1. The quality of film produced was tested by cold drawing and it was found to be capable of being cold drawn 40%. The remaining solution was stored for 48 days. It was noted that viscosity of the solution at the end of 48 days was the same as the fresh solution. Some of this solution that had been stored 48 days was then spread on a glass plate to a thickness of 1 mm and regenerated in the same manner as the film made from the fresh solution. The quality of this film was tested by cold drawing and it was found to be capable of being cold drawn 75%, thus indicating that storage in the solution does not degrade the chitin.

While particular examples of the present invention have been shown and described it is apparent that changes and modification may be made therein without departing from the invention in its broader aspects. The aim of the appended claims, therefore, is to cover all such changes and modifications as fall within the true spirit and scope of the invention.

I claim:

1. A process for forming films and fibers from chitin that is insoluble in dilute acids which comprises dissolving of said chitin in a solvent consisting of at least 2% lithium chloride in dimethylacetamide or N-methylpyrrolidone or mixtures thereof, casting the solution in the form of a film or fiber, removing the solvent by evaporation or by immersion in a non-solvent followed by washing in water and then drying said film or fiber.

2. The process of claim 1 wherein the non-solvent is acetone.

* * * * *